F. STORY.
DEVICE FOR CLEANING PIPES.
APPLICATION FILED NOV. 26, 1917.

1,274,103.

Patented July 30, 1918.

Inventor
Frank Story
By his Attorney
C.D. Haskins

UNITED STATES PATENT OFFICE.

FRANK STORY, OF SEATTLE, WASHINGTON.

DEVICE FOR CLEANING PIPES.

1,274,103.  Specification of Letters Patent.  Patented July 30, 1918.

Application filed November 26, 1917. Serial No. 204,094.

*To all whom it may concern:*

Be it known that I, FRANK STORY, citizen of the United States, residing at Seattle, in the county of King and State of Washington, have invented a certain new and useful Improvement in Devices for Cleaning Pipes, of which the following is a specification.

My invention relates to improvements in devices for cleaning pipes, and more particularly to improvements in devices for cleaning pipes through which oil or a like substance flows.

The object of my invention is to provide a peculiarly constructed valve that is adapted to be interposed in a pipe line through which liquid having a tendency to clog the pipe flows such valve being constructed so that it will not interfere with the flow of liquid in the pipe when in an open position and when closed will completely shut off the passageway through the pipe and connect that portion of the pipe on either side of the valve with a conduit through which steam may be admitted to clean out one end of the pipe at a time.

My invention is primarily intended to be installed on the pipe through which the lubricating oil of an ordinary automobile engine circulates but it will be understood that such device may be used on any pipe that has a tendency to foul or clog and wherein live steam or air may be used to soften and blow out the foreign substances contained therein.

My invention consists in the novel construction of a valve device and in the adaptation and combination of such device with a pipe as will be more clearly hereinafter described and claimed.

In the accompanying drawings Figure 1 is a plan view of my invention as it may appear when it is interposed in a pipe line;

Figure 1:
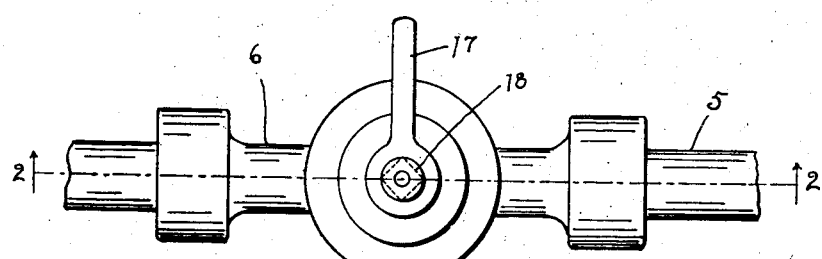

Referring to the drawings throughout which like reference numerals designate like parts the numeral 5 designates a pipe which may be the pipe through which lubricating oil is supplied to the crank case of an internal combustion engine and through which such oil continuously circulates.

6 is the body of a valve member that is adapted to be interposed in the line of the pipe 5 and is provided at both ends with threaded portions 7 adapted for the reception of sleeves or nuts 8 by which the valve member is connected with the two opposite ends of the pipe 5 to form leak proof joints.

Figure 2:
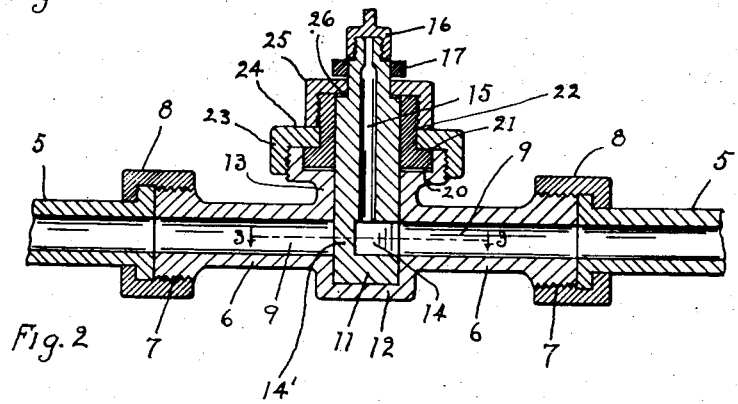
Fig. 2 is a view in vertical section on broken line 2, 2 of Fig. 1.
Figure 3:
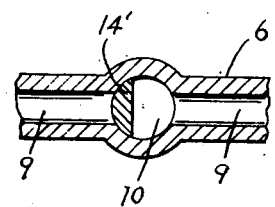
Fig. 3 is a view in cross-section on broken line 3, 3 of Fig. 2.

The valve member 6 is provided with an axial passageway 9 that registers with the openings in the two ends of the pipe 5, as more clearly shown in Fig. 2, and is also provided midway between its two ends with a valve chamber 10 arranged at right angles to the passageway 9 and adapted for the reception of a valve 11, the chamber 10 being larger than the passageway 9.

The valve chamber 10 extends below the valve body in a recessed projection 12 and above the valve body in a neck 13 so that when the valve 11 is inserted it will extend squarely across the passageway 9.

The valve 11 which is of larger diameter than the passageway 9 is provided with a recess 14 that is formed by cutting a notch of a width equal to the diameter of the passageway 9 squarely into one side of the valve member so that only a segment 14' of sufficient width to close the passageway 9 when it is turned crosswise thereof remains.

When the segment 14' is turned lengthwise of the passageway 9 it will be entirely out of line with such passageway and will leave the same entirely open.

The valve 11 is provided with an axial bore 15 that extends from the outer end of the valve inwardly and intersects the recess 14.

The outer end of the valve is provided with a cap 16, by which it may be closed when not in use, and with a handle 17 that fits over a square shank 18 by which the valve may be turned.

The upper end of the neck 13 is recessed as at 20 for the reception of the flanged bottom end 21 of a sleeve 22 and is externally threaded so that it may have a cap member 23 screwed thereon, the cap member having a flange 24 that fits over the flanged bottom end 21 of the sleeve 22.

The sleeve 22 is ground so that it will snugly fit the valve 11 and is externally threaded at its top end portion for the reception of a cap 25 that extends inwardly over the top of the sleeve 22 and over a shoulder 26 on the valve.

When the cap 25 is screwed tightly on to the sleeve 22 the flange 21 is drawn securely against the lower surface of the flange 24 on the cap member 23 and an oil tight joint is formed.

The cap 25 also serves as a lock nut to lock the sleeve 22 to the cap 23 and prevents the sleeve from turning when the valve 11 is turned.

When the pipe 5 has become clogged or partly clogged and it is desired to clean it out the cap 16 is removed, the valve 11 is turned so that the passageway 9 in one direction will be entirely closed, a steam pipe is connected with the passageway 15 and steam under pressure is admitted to clean out one end of the pipe 5. When one end is cleaned out the valve 11 may be turned through an angle of one hundred and eighty degrees and the opposite end of said pipe 5 is subjected to said steam under pressure whereby the foreign matter will be removed.

The valve may then be turned back into the open position, the steam pipe disconnected and the cap 16 replaced to prevent the escape of oil through the passage 15.

It is apparent that when the valve is in the open position the segment 14' will be entirely out of line with the passageway 9 and offer no obstruction to the free passage of liquid owing to the larger diameter of the valve chamber 10.

It is obvious that changes in the precise form of construction and arrangement of parts of my invention may be resorted to within the scope of the following claims:

What I claim is:

1. A device of the class described comprising a valve body having an axial passageway and provided with a cylindrical valve chamber of larger diameter than said passageway and arranged at right angles thereto; and a cylindrical valve rotatably disposed in said valve chamber, said valve having a recess in alinement with said passageway, said recess being equal to the diameter of said passageway and leaving a segment that is entirely out of alinement with said passageway when said valve is opened and which entirely closes said passageway when said valve is closed.

2. A device of the class described comprising a valve casing having an axial passageway, a cylindrical valve chamber arranged at right angles to and intersecting said passageway said valve chamber being of larger diameter than said passageway, a cylindrical valve disposed in said chamber said valve having a recess in alinement with said passageway and being provided with an axial bore that intersects said passageway, means for turning said valve to open or close said passageway, a cap for the end of said valve to close said bore and packing devices encircling said valve.

In witness whereof, I hereunto subscribe my name this 20th day of November, A. D. 1917.

FRANK STORY.